US005638287A

United States Patent [19]
Appel

[11] Patent Number: 5,638,287

[45] Date of Patent: Jun. 10, 1997

[54] REFLECTIVE WAVE COMPENSATION ON HIGH SPEED PROCESSOR CARDS

[75] Inventor: William D. Appel, Boca Raton, Fla.

[73] Assignee: International Business Machines Corporation, Armonk, N.Y.

[21] Appl. No.: 689,186

[22] Filed: Aug. 5, 1996

Related U.S. Application Data

[63] Continuation of Ser. No. 175,327, Dec. 29, 1993, Pat. No. 5,544,047.

[51] Int. Cl.$^6$ .......... H04B 15/00

[52] U.S. Cl. .......... 364/488; 379/406; 333/4

[58] Field of Search .......... 364/488; 379/406; 370/6, 32.1; 333/4, 5, 12; 326/30

[56] References Cited

U.S. PATENT DOCUMENTS

| | | | |
|---|---|---|---|
| 3,370,294 | 2/1968 | Kahn | 379/406 |
| 3,419,682 | 12/1968 | Thompson et al. | 379/406 |
| 3,462,561 | 8/1969 | Deman | 379/406 |
| 3,465,106 | 9/1969 | Nagata et al. | 379/406 |
| 3,723,883 | 3/1973 | Renner | 455/304 |
| 4,300,092 | 11/1981 | Strenglein | 379/413 |
| 4,493,092 | 1/1985 | Adams | 375/257 |
| 4,507,793 | 3/1985 | Adams | 375/257 |
| 4,645,883 | 2/1987 | Horna et al. | 379/406 |
| 4,686,703 | 8/1987 | Bruno et al. | 379/406 |
| 4,727,543 | 2/1988 | Bauer | 370/32.1 |
| 4,866,768 | 9/1989 | Sinberg | 324/617 |
| 4,998,079 | 3/1991 | Theall, Jr. | 333/112 |
| 5,175,515 | 12/1992 | Abernthy et al. | 333/4 |
| 5,304,856 | 4/1994 | Rainal | 333/4 |

*Primary Examiner*—Vincent N. Trans
*Attorney, Agent, or Firm*—Daniel E. McConnell

[57] ABSTRACT

Packaged signal routing circuits (e.g. on printed circuit cards or boards), route pulse signals with very short rise times from a lossy driver to multiple devices. In these routing circuits, a complex network of conductors branches from a common junction adjacent the driver output into multiple (in the disclosed embodiment, three) conduction paths of unequal length. In accordance with the invention, the internal impedance of the driver is matched to the aggregate charateristic impedance of the branch paths, and a lossless compensating circuit is attached to a shortest branch path. The compensating circuit is designed to transfer signal reflections of predetermined form to the branching junction at the driver via the shortest branch. Without the compensating circuit, reflections presented to the branching junction from the shortest branch are dissimilar to reflections presented to that junction from other branch paths. Consequently, re-reflections return from the junction to the branches, causing distortions in signals sensed at the devices. However, with the compensating circuit connected in the shortest branch, reflections presented from that branch to the junction appear in a form matching reflections presented by the other branches; and the reflections from all branches then cancel at the driver junction. Consequently, signals sensed at the devices have considerably reduced distortions due to the absence of re-reflections. In a preferred embodiment, the compensating circuit consists of a printed circuit trace of predetermined length (representing a transmission line stub with predetermined phase delay characteristics) in series with a point capacitor (or several point capacitors) having predetermined capacitance (determining the shape of the compensating reflections). The compensating circuit, which extends beyond the end of the shortest branch, connects between the end of that branch and reference potential (e.g. ground). The end of the shortest branch is also attached to a device required to sense signals appearing at that point. A new method and polarized bridge device are disclosed for use in analyzing such networks in particular (and for analyzing transmission line effects in general). This method and device permit precise observation and comparison of reflections produced in branches of a network emanating from a common junction, and accurate determination of compensation suitable for modifying such reflections.

3 Claims, 6 Drawing Sheets

REFLECTIVE WAVE COMPENSATION ON HIGH SPEED PROCESSOR CARDS

RELATED APPLICATION

This application is a continuation of application Ser. No. 08/175,327 filed 29 Dec. 1993 and issued as U.S. Pat. No. 5,544,047 on 6 Aug. 1996, the priority of which is claimed under 35 USC 120.

BACKGROUND OF THE INVENTION

1. Field of the Invention

This invention relates to reflective compensating arrangements for reducing transmission line noise effects in electrical circuits (e.g. printed circuit boards and cards) which route pulse signals to multiple loads (representing signal receiving circuits or devices) through complex signal conduction networks.

2. Background Discussion and Related Art

As technology advances, rise times of pulse signals tend to shorten and approach signal propagation times between signal drivers/sources and receiving loads. Consequently, small lengths of signal conductors can act like analog transmission lines, producing reflections which may distort received signals (producing effects such as ringing, bouncing, overshoot, etc.); especially in signal conducting networks originating at the source and splitting into multiple branches en route to the loads. Such distortion, combined with other sources of noise (e.g. cross-talk between conductors), may produce faulty operations in circuits which otherwise appear to have satisfactory design specifications. Accordingly, designers of digital logic and devices for high technology packaging (e.g. on printed circuit cards or boards) have become increasingly concerned with such transmission line effects, especially with respect to circuits having critical timing requirements for signal reception.

U.S. Pat. No. 5,175,515, granted Dec. 29, 1992 to M. G. Abernathy et al, discloses a technique for routing pulse signals on printed circuit boards (PCB's) which relies essentially on configuring signal loads into branching tree formations extending symmetrically from a signal source, and if necessary appending "lossy" ac or dc terminators at or near a last load in each branch (ostensibly to absorb energy and reduce signal reflections in each branch).

However, it is known that end terminators alone can not eliminate excessive distortions due to transmission line reflections, and it is recognized presently that such terminators may not be effective even when combined with the branch balancing technique suggested in the Abernathy et al patent. Furthermore, topological packaging restrictions may make branch balancing impractical or very difficult (and therefore costly) to implement.

Even more significant, it is recognized presently that signal distortions associated with transmission line effects are due to both reflections and re-reflections of signals, rather than to reflections only, and that taking steps to suppress or reduce re-reflections may be more useful for reducing aggregate distortion, and easier and less costly to implement, than any of the techniques suggested by Abernathy et al. Ancillary to this last observation is a recognition of a need for improved methods for analyzing signal reflections in transmission lines and compensating for their effects.

Although analysis of signal reflections in single line transmission paths may be rather straightforward, the analysis quickly becomes tedious or even unmanageable for complex transmission paths with multiple branches. A time-based analysis of any point in a transmission network with multiple branches reveals superpositions of incident and reflected signal components at the respective point, but in an algebraically additive form in which information about origins and polarizations of individual signal components is unavailable. Accordingly, it is recognized presently that time-based analyses are unsuitable for dealing with reflection problems of the type which the present invention seeks to resolve.

OBJECTS AND FEATURES

An object of the invention is to provide a circuit for routing pulse signals from a lossy driver source to multiple devices, over a network of conductors branching from a common junction into conductive paths having different lengths and forms, and in which reflections from all branches of the network cancel at the common junction.

Another object is to provide the foregoing routing circuit with a network of conductors branching from a common junction that originates at or adjacent to the driver into multiple paths of dissimilar length and form, so that, in appropriate circumstances, reflections in the branches cancel at the common junction; where the appropriate circumstances are that the internal impedance of the driver is matched to the aggregate characteristic impedance of the branches and reflections in the branches are constrained to have generally similar phase and amplitude characteristics. Conversely, it should be noted that if the common junction is remote from the driver, the characteristic impedance of the path leading to the junction would not match the aggregate characteristic impedance of the branches and reflections from the branches would not cancel at either the junction or the driver. Also it should be noted that if the reflections from the branches are not constrained to have generally similar phase and amplitude forms the reflections will not cancel even if the common junction is adjacent to the driver.

Another object is to provide a signal routing circuit with branches of different lengths, originating at a common junction adjacent a driver, and with a compensating circuit attached to the end of a shortest branch conductor to constrain reflections returning from that branch to the common junction to have phase and amplitude characteristics matching those of reflections returned to the junction from at least one other branch. An associated object is to provide the compensating circuit in the shortest branch without altering lengths of signal conduction paths between any device attached to the network and the driver.

Another object is to provide a signal routing circuit of the above kind in which the length of the shortest branch with the compensating circuit attached to it is less than the length of at least one other branch.

Another object is to provide a signal routing circuit of the above kind in which the compensating circuit presents a lossless impedance to signals received by it.

Another object is to provide a branched signal routing circuit of the above kind in which signals generated by the driver are constrained to have amplitudes within predetermined limits, and reflections returned to the common junction have amplitudes falling outside the predetermined limits, and reflections returned from the shortest branch with the compensating circuit attached ot it also have amplitudes falling outside the predetermined limits. A related object is to provide a routing circuit as just stated wherein the compensating circuit attached to the shortest branch contains a lossless impedance which is designed intentionally to produce reflections with amplitudes falling outside the predetermined limit in order to match the form of similar reflections formed in a branch other than the shortest branch.

Another object is to provide a computer system in which pulse signals representing address bits, that are generated by lossy drivers in a processor, are transmitted to multiple cache RAM devices and a cache controller over conductive routing networks of complex form, wherein: 1) each routing network branches from a common junction adjacent a driver to multiple conduction paths with unequal lengths and dissimilar forms; 2) the conduction paths originating at the common junction connect to the RAM devices and the cache controller; 3) timing requirements for detection of the transmitted signals are critical; 4) the shortest branch conduction path connects only to the cache controller; and 5) the shortest branch contains a compensating circuit designed to cause reflections returned from that path to the common junction to match reflections returned to the same junction from other branch paths.

Another object is to provide a method for analyzing pulse signal waveforms in transmission lines which uses a conventional CAD (Computer Aided Design) tool to permit observation of signals propagating bidirectionally through any point in a transmission line, wherein signals passing the point in either direction are accurately observable independently of signals passing in the opposite direction, and wherein signals are conveyed through the point of observation without attenuation regardless of any attenuation introduced by the observing process.

Another object is to provide a polarized bridge device or instrument, that can be inserted at a point in a transmission line, by splitting the line at that point into two fully separated segments and attaching the device between the segments, and that can be used when so attached to precisely measure signals conveyed from either segment to the device, as well as to cross-couple such signals between the segments without attenuation, regardless of any attenuation introduced by the signal measuring function.

Another object is to provide a method for analyzing signals transmitted through signal routing networks of complex form, which allows for more precise observation of signal reflections than methods used heretofore for such observation. A related object is to provide an analysis method of the kind just characterized which is readily implementable on conventional CAD (Computer Aided Design) programming tools.

A feature of the invention is that it provides a pulse signal routing circuit that contains multple signal conducting paths of dissimilar lengths and forms branching from a common junction, and in which signal reflections returned from the branch signal conducting paths to the common junction are cancelled at that junction. A related feature is that signals applied to the routing circuit are generated by a lossy driver and the common junction of the branch paths is located adjacent the driver. Another related feature is that the internal impedance of the driver is matched to the aggregate impedance of the branch signal conducting paths. Another related feature is that if there are N branch signal conducting paths having a given characteristic impedance, the internal impedance of the driver is configured to be 1/N times the characteristic impedance.

Another feature is that in a routing circuit of the above kind a compensating circuit is connected to a branch conducting path of shortest length in order to cause reflections returned to the common junction from that path to have phase and amplitude characteristics matching phase and amplitude characteristics of reflections returning to the junction from at least one other path.

Another feature is that the aforesaid compensating circuit presents a lossless impedance to signals that it receives.

Another feature is that the compensating circuit contains a short length of conductor which acts as a transmission line stub to add predetermined phase delays to signal reflections produced in the compensating circuit.

Another feature is that the compensating circuit includes a lossless impedance in series with the aforesaid stub conductor.

Another feature is that the lossless impedance .is constituted by a point capacitor having a small capacitance.

Another feature is that in a routing network with dissimilar branches, in which pulses generated at the driver have a single polarity and reflections returned to a branching juncture from some branches have phase portions with polarity opposite to the polarity generated at the driver, the compensating circuit produces matching reflections including phase portions of opposite polarity.

Another feature of the invention is in its application to routing address signals from a processor to multiple cache RAM devices and a cache controller. In that application, signals representing address bits of different significance are generated by multiple lossy drivers and applied in parallel to multiple signal routing networks, each of which branches at the driver into multiple branch signal conducting paths of different length, including a shortest branch path connecting to the cache controller and a compensating circuit, and longer branch paths connecting to the cache RAM devices. The internal impedances of the drivers are configured to match aggregate characteristic impedances presented by the branches, and the compensating circuit is designed to cause reflections returning to the driver from the shortest path to have amplitude and phase characteristics matching characteristics of reflections returning in the other branch paths. Consequently, all reflections in the branches cancel at the drivers.

A feature of a preferred embodiment of the compensating circuit is that it extends the length of the shortest path slightly, in respect to reflections produced in that path, but does not affect lengths of connections between the drivers and the the cache controllers or cache devices; whereby detection of the address signals at the cache controller and cache devices is not delayed by the compensation function. Another feature of the foregoing application to address signal routing is that address signals generated by the drivers are confined within predetermined amplitude limits, reflections produced in the branches are allowed to overshoot and undershoot the predetermined limits by significant amounts, and yet signals received by the cache controller and cache devices, when the compensating circuit is connected to the shortest branch, are held within limits very close to the predetermined limits of the driver. Consequently, with the compensating circuit present, the cache controller and cache devices have minimal exposure to damage from excessive signal swings, whereas the exposure to damage would be substantially greater if there was no compensating circuit.

Another feature of the invention is that it provides a unique method for precisely observing and analyzing incident and reflected aspects of pulse signals carried on conductors acting as transmission lines.

A feature of the present analysis method is that fully isolates incident and reflected aspects of the conducted signals, whereby an analyst can precisely observe either aspect and take steps to effectively modify either aspect.

Another feature of this method is that it is implementable on conventional CAD (Computer Aided Design) programming tools which include capabilities for simulating realistic properties of transmission lines.

Another feature of this method is that it introduces unique simulated bridge circuits at ends of split segments of a transmission line model. Although conceptually having parts that are similar in form to conventional SWR (Standing Wave Ratio) bridges, the bridge circuits presently have a unique aspect of providing complete isolation between measurements made at each split end (i.e. measurements made relative to one segment of a split line are fully isolated form measurements made relative to the other segment of the same line), and the parts of the bridge circuit which make these measurements are virtually cross-coupled so as to convey signals between the line segments, and across the split, without adding attenuation or distortion to those signals.

A feature of this cross-coupling is that it effectively compensates for any attenuation introduced by components of the bridge circuit (e.g. resistors) through which the cross-coupled signals are sensed and reproduced.

Another feature is that waveforms representing incident and reflected signals originating at opposite ends of the split line are are separately cross-coupled without attenuation, so that their characteristics are separately and precisely measurable in the bridges.

A feature of the above analysis method is in its application to pulse routing networks of the type characterized above, containing branches of different length and form. In this application, a realistic model of the network is formed and bridge circuits of the foregoing type are inserted into splits formed in plural branches having different lengths (and therefore different reflections). The bridge circuits allow for comparative observation of reflections at each split. The splits are located virtually at the juncture at which the branches originate, and a simulated lossless compensating circuit is inserted into a shortest one of the split branches to produce reflections from that branch which at the branching juncture have phase and amplitude characteristics that match those of reflections produced by other branches.

In a disclosed embodiment, the signal drivers, signal routing networks, and devices required to detect the signals, are packaged in printed circuit cards or boards wherein printed circuit traces all have a predetermined characteristic impedance, and the internal impedances of the signal drivers are configured to match the aggregate characteristic impedance presented by respective signal routing networks. Also, the compensating circuit connected to the shortest branch in each routing network contains one or more printed circuit traces terminating in an impedance producing reflections of predetermined form relative to reflections produced in other branches; and the trace (or traces) contained in each compensating circuit is so situated that it (or they) does (or do) not affect lengths of signal conduction paths between the drivers and devices which are required to detect information represented by signals transmitted by the drivers.

In a preferred embodiment the trace or traces added to the shortest path is/are connected in series with a lossless impedance (representing the reflective termination mentioned previously). The added trace(s) together with the lossless impedance produces reflections having amplitude and phase characteristics matched to amplitude and phase characteristics of reflections produced in other than the shortest branch. A preferred embodiment of the foregoing lossless impedance is a point capacitor.

In an alternate embodiment, the compensating circuit consists only of a plurality of traces which extend the length of the reflective path in the shortest path and terminate in a sub-branching formation of traces mirroring similar sub-branching formations of non-compensating traces in the other branches.

Other features and facets of the subject network, compensating circuit structures used therein, placement of the compensating circuits in the network, transmission line analysis method, etc., are also disclosed herein and represent associated features and facets of the present invention.

BRIEF DESCRIPTION OF THE DRAWINGS

FIG. 3A shows the basic line model extending between a signal source driver and a simple terminating load;

FIG. 3B shows the same line model with a simple signal sensing bridge inserted at a selected point in the line to permit separate observation of signals passing through the line in both directions, but with limited accuracy of observation due to signal attenuation caused by the structure of the bridge and the manner in which it connects to the line;

FIG. 3C shows the same line model, with a polarized bridge attached at the selected observation point in accordance with one aspect of the present invention; this bridge providing more accurate and isolated observation of signals travelling through the selected point, while transporting these signals through the selected point without attenuation;

FIG. 3D shows an appropriate form of resistive termination for a portion of the polarized bridge device shown in block form in FIG. 3C;

FIG. 3E shows the arrangement of FIG. 3C, including details of circuits forming the polarized bridge shown as a block in FIG. 3C;

FIG. 6A shows the appearances of reflected signals in the bridged branches prior to addition of compensation, and FIG. 6B shows the appearances of the same signals after addition of compensation.

FIG. 7A shows how the signals appear before compensation is added to the shortest branch path in the routing network of FIG. 5. FIG. 7B shows how the signals appear after addition of compensation.

DETAILED DESCRIPTION

1. Introduction—Description of Problem Solved

Figure 1:
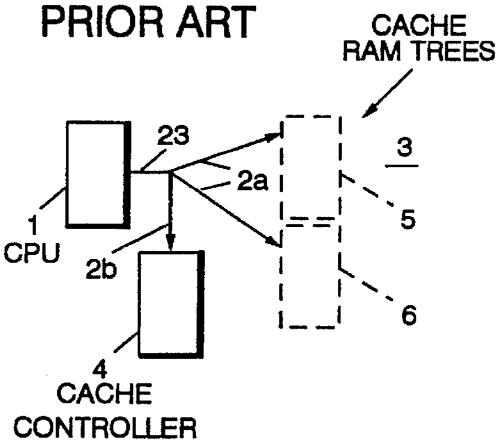
FIG. 1 PRIOR ART
FIG. 1 is a schematic of a prior art network for distributing address pulse signals from a processor (CPU) to multiple loads including ten cache RAM memory units and a cache memory controller FIG. 1A schematically illustrates details of how the network shown in FIG. 1 connects to individual cache RAM devices (where FIG. 1 only indicates connections from the network to groups of cache devices shown in blocks).

The schematic block diagram in FIG. 1, shows a contemporary pulse signal routing network to which the present invention is potentially applicable. This diagram is useful for understanding the transmission line reflection problem solved by this invention.

Processor (CPU) 1 has address signal drivers connecting via address bus 2 to multiple devices. Bus 2 has an initial segment of some arbitrary length (hereafter designated the feeder segment) that diverges into three separate branches; two of which are indicated at 2*a* and the third at 2*b*. Branches 2*a* connect to multiple cache RAM devices shown generally at 3, and branch 2*b* connects to a cache controller 4. Bus 2 and its branches 2*a* contain 32 parallel conductive lines for conveying 32-bit address words to the cache RAM's at 3, whereas branch 2*b* contains only 14 conductive lines for conveying a subset of high order bits of such address words to cache controller 4 (the cache controller requiring detection of only such subsets for performing its tasks; e.g. for determining if an address currently signalled is in a range previously mapped into the caches). In the environment presently contemplated for application of the subject invention, address signals transferred from the CPU 1 to bus 2 are generated by "lossy drivers" having an internal impedance $Z_D$ on the order of 20 ohms.

The cache RAM's 3 are arranged in two groups or clusters, outlined in block form at 5 and 6, each group containing five RAM units. These units, and at least the 14 conductors connecting them to the sources of the bit signals required to be transmitted to the controller 4, are laid out in the form of two trees; one outlined at 5 and the other at 6. The conductors in these trees and the loads formed by the RAM's are assumed to be symmetrical (in length and impedance properties) so that the signal networks extending to these trees present approximately balanced loads to the source drivers.

Circuit configurations of the type shown in FIG. 1 typically are contained in printed circuit packages (cards or boards) on which the printed circuit traces present a predetermined characteristic impedance. For supporting a reflection cancellation feature of the present invention (refer to description of FIG. 2 below), the drivers which generate the address signals placed on bus 2 are designed to have internal impedances $Z_D$ equal to ⅓ the characteristic impedance of line traces in the printed circuit package (so that if the driver outputs are located adjacent the junction of branches 2*a* and 2*b*, in accordance with one aspect of this invention, the internal impedances of the drivers will match the aggregate characteristic impedance presented by the three branches, and support reflection cancellation functions explained later).

Although prior art circuit configurations of the type shown in FIG. 1 generally have a feeder line of substantial length, between the drivers that generate the address signals and the junctions at which the lines 2 branch into separate branches 2*a* and 2*b*, it will be shown below that for application of the present invention, and for optimum operation generally, the driver outputs should connect directly to the branch junctions, and the feeder lines should be eliminated.

Figure 1A:
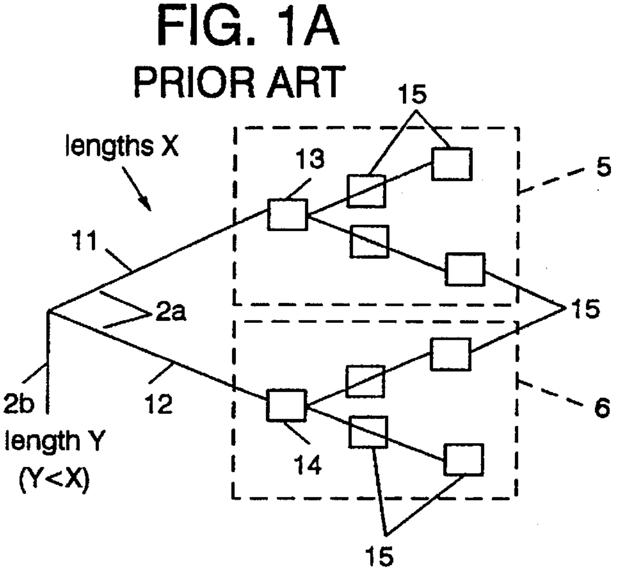
FIG. 1A PRIOR ART

The signal reflection problem associated with the unsymmetric network formed by the branches of bus 2, is explained with reference to FIG. 1A (which shows details of connections between lines in bus branches 2*a* and individual cache RAM devices). Branches 2*a* consist of separate line segments 11 and 12, originating at the junction between branches 2*a* and branch 2*b*. Segment 11 connects directly to a first RAM unit 13 in group 5 and cache 12 connects directly to a first RAM unit 14 in group 6. At their connections to RAM's 13 and 14, segments 11 and 12 each split into two sub-branches, each of the latter having tapped connections to two additional RAM units. The (eight) additional RAM units connected to the (four) sub-branches are collectively indicated at 15.

For the signal routing environment presently contemplated, segments 11 and 12 have equal lengths X, and the sub-branches extending from them have equal lengths less than X. Due to transmission discontinuities presented at the split ends of segments 11 and 12, signals reflected from these ends will contain pulse phases opposite in polarity to signals generated at the drivers. Furthermore, branch 2*b*—having a length Y shorter than X, having only a single load connection (to the controller 4, FIG. 1 ), and having no elements comparable to the sub-branching formations at 13 and 14—will have signal reflections always of the same polarity as those generated by the drivers and of a form otherwise differing from the form of reflections produced in the branches 2*a*. These differences between the branches, and the existence of a feeder line of finite length between the driver outputs and the branches, are a major source of transmission line effects tending to distort the signals appearing at the cache controller and the cache RAM devices. As will be shown later, distortions resulting just from differences in the branch can have undershoot and/or overshoot components of a magnitude exposing the controller and cache devices to potential damage. These distortions can be eliminated or significantly reduced by the present invention.

In the environment benefitting from application of this invention, CPU 1, cache's 13–15, and cache controller 4 are assumed to be operated at very high internal clock rates and to require tight time coordination in respect to communication of address information. For example, CPU1 could be an Intel P5 (Pentium brand microprocessor) type processor, the cache RAM's may be Intel type C8C units of a type used in association with Pentium processors, and the cache controller may be an Intel C5C type cache controller unit having similar association with the Pentium.

Due to their high speeds of operation, the processor and these units, particularly the cache controller, have critical timing tolerances for transmission and reception of address signals. Delays of these functions by a few nanoseconds could result in unacceptable operation of the system containing these devices. Without the compensation technique of the present invention, and depending upon the amount of noise generated by factors other than signal reflections and re-reflections, it might be either very costly or impractical to manufacture imbalanced routing networks of the type shown in FIGS. 1 and 1A, even though such imbalances (particularly, the shorter length of the address bus path to the controller) might be necessary for proper coordination of the system.

What is recognized presently, is that if branches of such asymmetric networks join at or adjacent to the signal drivers, and if reflections in all branches are made to align with each other in phase and amplitude, such reflections will effectively cancel each other at the source; thereby reducing re-reflections that otherwise would occur at the drivers. Furthermore it is recognized that re-reflections are a major cause of distortion in the signals received by devices attached to such networks.

Based upon this recognition, a compensating circuit of special form, and a special technique for determining its design, have been devised. The compensating circuit is formed to make signal reflections in physically dissimilar signal routing branches align and cancel at a common junction of the branches, and signals received at devices attached to the network would appear with significantly reduced distortion; in instances where, if not for the compensation, reflections from the branches would inevitably give rise to complex re-reflections and signals received by the devices would have considerably more distortion. The invention as applied to such branched routing networks—i.e. the adding of compensation to a shortest branch of a network having a branch junction adjacent a driver having internal impedance equal to ⅓ the characteristic impedance of a line trace, and the process and devices used for determining appropriate components of the compensating circuitry—are described in the next sections.

2. Network Branch Compensation—Preferred Embodiment

This section describes electrical forms and properties of compensating circuitry operating in accordance with the invention, and the next section will describe a modelling (simulation) process, and a bridge device used in that process, by means of which reflections are analyzed and compensation suitable for causing cancellation of the reflections is determined.

Figure 2:
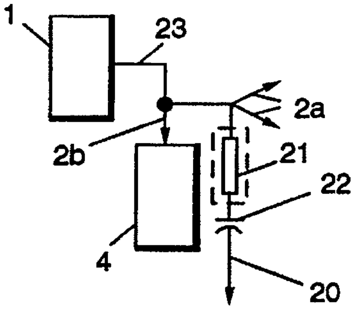
FIG. 2 shows the network of FIG. 1, with a compensating circuit attached to a shortest branch of the signal distributing network in accordance with a preferred embodiment of the invention.

FIG. 2 shows the network of FIG. 1 with a compensating circuit arrangement 20 connected to the juncture of branch 2b and its load (cache controller) 4 in accordance with the invention. Circuit 20, including a printed circuit trace (line) 21 of predetermined dimensions in series with one or more point capacitors 22, is connected between the input to load 4 and reference potential (e.g. ground). In the routing network shown here, the feeder segment 23 is assumed to have 0 or negligible length.

Figure 2A:
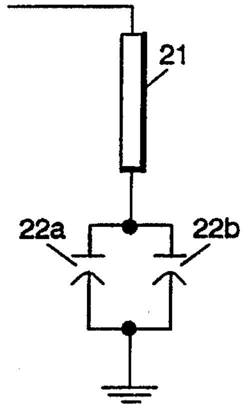
FIG. 2A illustrates an alternate embodiment for the compensating circuit shown in FIG. 2.
Figure 2B:
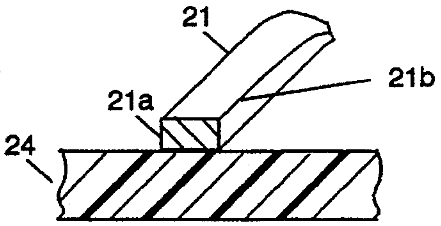
FIG. 2B provides a sectional view of a printed circuit substrate and a printed circuit trace forming part of the compensating circuit in FIG. 2.

FIG. 2A shows a view of the same arrangement indicating that the capacitor 22 may consist of two point capacitors, 22a and 22b. FIG. 2B shows a cross-setional view 21a of stub conductor 21, and the dielectric substrate 24 suporting that conductor; indicating the width and height dimensions of the conductor as parameters which potentially could be varied (in addition to length) to achieve desired reflection characteristics. FIG. 2B also suggests a bend or curve in the conductor, at 21b, to indicate that the conductor need not be perfectly linear in form.

From the foregoing, it should be appreciated that a compensating circuit in accordance with the invention could have many different forms, depending upon network complexity and allowances for added costs to support addition of such circuits to printed circuit or other packages requiring compensated reflections.

3. Method for Analyzing Signals in Transmission Lines

A preferred method for determining optimal compensating parameters involves use of a known CAD (Computer Aided Design) program tool that supports analysis of system models containing analog and digital components, and that contains a facility for generating transmission line models with realistic characteristics (i.e. where the line models have signal conduction characteristics corresponding to those of real conductors). A conventional tool used for the analysis described here is the IBM Advanced Statistical Analysis Program (ASTAP), described in the following publications:

1) Advanced Statistical Analysis Program (ASTAP) Reference Guide, Pub. No. LY20-0764, IBM Corporation, White Plains, N.Y.
2) Advanced Statistical Analysis Program (ASTAP) Logic Manual, Pub. No. LY20-0765, IBM Corporation, White Plains, N.Y.
3) Advanced Statistical Analysis Program (ASTAP) Program Reference Manual, Pub No. SH20-1118, IBM Corporation, White Plains, N.Y.

Other conventional CAD tools could be used for the same purpose if the can generate realistic transmission line models equivalent to those generated by the "RLINE" function of ASTAP.

3.1. Method as Applied to Simple Single-Line Network

FIGS. 3A thru 3E illustrate development of a facility for precisely observing signals flowing bidirectionally in a (realistic) model of a simple transmission line without branches. The final configuration (FIG. 3E) permits separate observation of incident and reflected waveforms passing through a selected point in the line model, for an input pulse generated at one end of the line with selected amplitude, duration, and rise and fall times. A model of a branched network corresponding to the configuration of FIG. 2, and a technique for comparative observation of signals flowing in two or more of the branches, is described later with reference to FIG. 5.

Figure 3A:
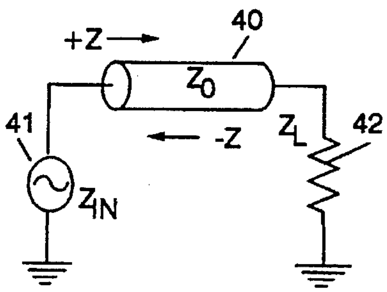
FIGS. 3A thru 3E show progressive development of a simulation model of a simple signal routing network, consisting of a single transmission line, with bridging circuits inserted into the model to permit observation of signal reflections in the line isolated from incident signal components propagating on the line in the opposite direction. In these figures.

FIG. 3A shows a simple transmission line 40, with characteristic impedance $Z_0$, connected between a signal driving source 41 and load 42; the source and load having respective internal and load impedances $Z_{IN}$ and $Z_L$. Directions of signal flow towards and away from the load are shown by arrows labelled +Z and −Z.

For this simple type of line configuration, without branches or other discontinuities, it is known that if the load impedance is equal to the characteristic impedance of the line, signals propagating in the +Z direction are absorbed at the load, whereas if the same impedances are unequal reflections are produced at the load which traverse the line in the −Z direction. If the load impedance is greater than the characteristic impedance of the line, the reflected signal has the same polarity as the incident signal, whereas if the load impedance is less than the characteristic impedance the reflected signal will have a polarity opposite to that of the incident signal.

Figure 3B:
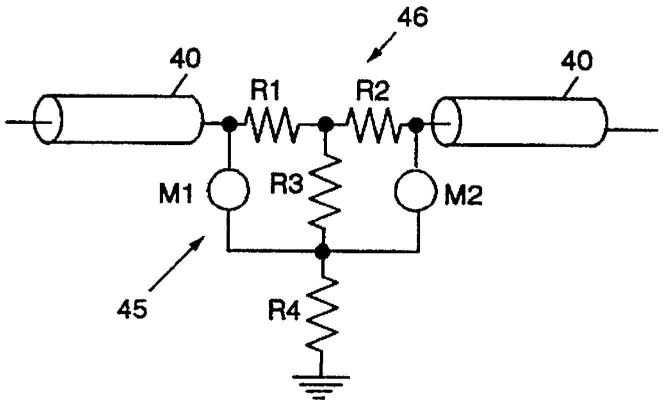

Since signal travel time between source and load is constant, leading edges of associated incident and reflected signals can be observed by sampling a midpoint of the line at instants of time representing predefined fractions of the end to end travel time. FIG. 3B shows insertion of a simple resistor bridge 45, at a selected point 46 in the line model, to permit such signal observations at (metering) elements M1 and M2. M1 senses signals flowing in the +Z direction at the bridge insertion point, but is unaffected by signals flowing in the −Z direction; while M2 senses signals flowing in the −Z direction, and is unaffected by signals flowing in the +Z direction.

Resistors R1 and R2 are assigned very small values (e.g. 1 ohm each), and the voltage divider formed by resistors R3 and R4 can be dimensioned to minimally attenuate measured signals (e.g. by setting resistance values R3=4.995 ohms and R4=494.05 ohms). However, this type of bridge dissipates power at each sampling instant, and for the accuracy of measurement required presently a more ideal (less dissipative) bridge is needed. Construction of a presently useful bridge configuration, with virtually ideal signal dissipation properties, is shown in FIGS. 3C thru 3E.

Figure 3C:
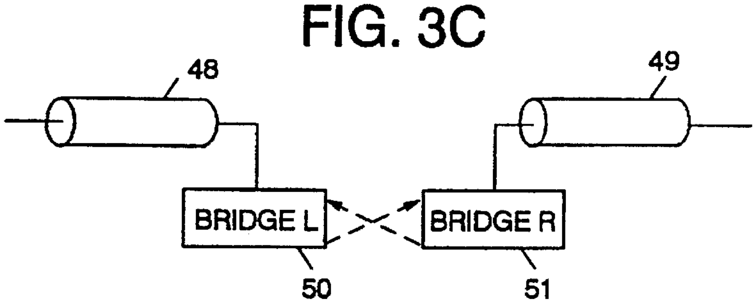
Figure 3D:
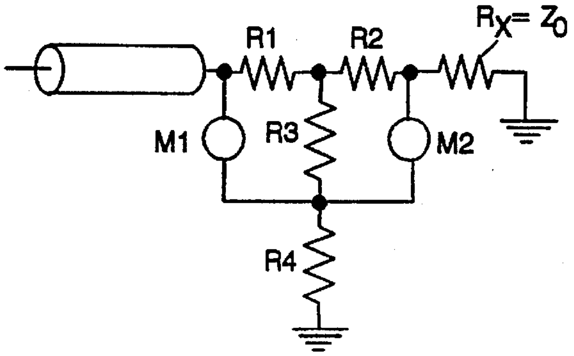

In FIG. 3C, the transmission line model is fully severed into electrically isolated left and right segments, 48 and 49 respectively. Identical left and right bridges, 50 and 51 respectively (also bridge L and bridge R respectively), are attached to ends of segments 48 and 49 at their break point. These bridges are cross-coupled in a manner described below to provide presently needed ideal observation capabilities. Incident and reflected signals sensed in bridges L and R respectively are applied as inputs to generators in bridges R and L respectively to span the break without dissipating signals in either sensed path.

Proper choice of bridge components ensures that "run-away" conditions are not created by such cross-coupling. Terminating resistors $R_X$ are appended to each bridge as suggested for bridge L in FIG. 3D. Values of $R_X$ are set equal to $Z_0$ (the characteristic impedance of the line) so that signals received at these resistors are fully dissipated.

Figure 3E:
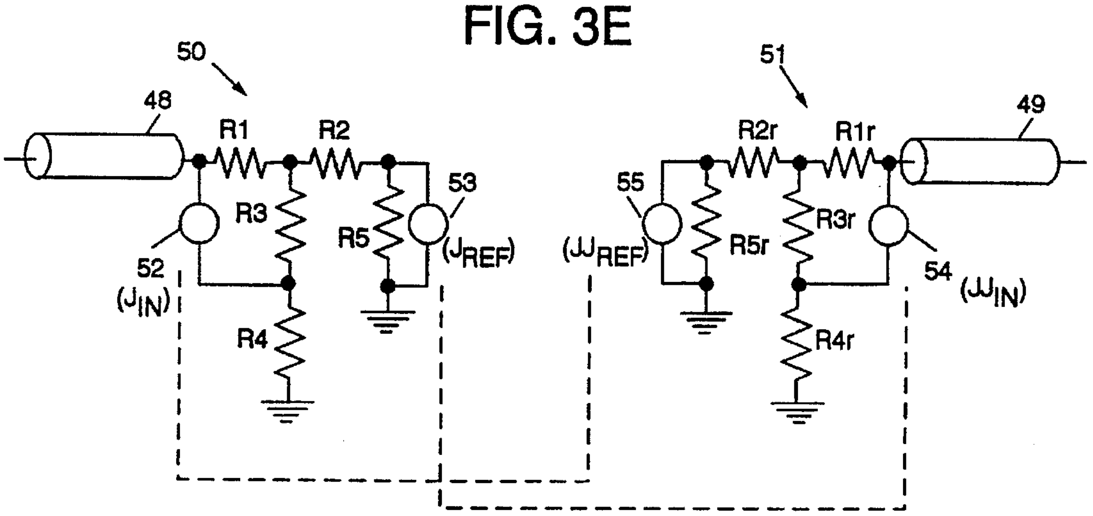

In the complete cross-coupling circuit, shown in FIG. 3E terminating resistors $R_X$ are represented in the left bridge by resistor R5 in parallel with simulated generator 53, and in the right bridge by resistor R5*r* in parallel with simulated generator 55. Signals sensed in the left and right bridges, by respective simulated voltage detectors 52 and 54, are cross-coupled to respective opposite bridges without dissipation or distortion. Signals sensed in the left bridge by voltage meter/detector 52 ($J_{IN}$) are applied to output generator 55 in the right bridge ($JJ_{REF}$), and signals sensed in the right bridge by meter 54 ($JJ_{IN}$) are applied to output generator 53 ($J_{REF}$) in the left bridge. Signals cross-coupled to generators 53 and 55 in these bridges are scaled, to compensate for attenuation of respective signals in the bridge circuits, so that the cross-coupled signals are effectively applied without attenuation to split ends of the line segments 48 and 49, and effectively traverse the model line as if the line were continuous and the bridges were not present.

The attenuation of measured voltages at voltage detectors 52, 54 and the scaling factors required for "transparent" cross-coupling are determined by the following equations (shown for the left bridge and identical in concept for the right bridge). The voltage $V_L$ detected at detector 52 is:

$$V_L = V_A - V_{R4} = V_A - V_B\left(\frac{R4}{R3+R4}\right) = V_A - V_A\left(\frac{Z_0 - R1}{Z_0}\right)\left(\frac{R4}{R3+R4}\right)$$

where $V_A$ is the voltage across R1, R3 and R4: and $V_B$ is the voltage across R3 and R4. Now, note that:

$$\left(\frac{R4}{R3+R4}\right) = \left(\frac{Z_0}{Z_0+R1}\right)$$

Therefore, $$V_L = V_A\left(1 - \frac{Z_C + R1}{Z_C + R1}\right)$$

This attenuation (of the detected voltage) must be offset by scaling the signal source in the opposite bridge (generator 55 in this example). Furthermore, a signal injected at that source would be further attenuated by resistance in the right bridge. Viewed in the opposite direction, a "reflected" signal injected by generator 53 will be attenuated by the impedance to the left of that generator. Thus, to faithfully recreate the reflected signal at the split end of segment 48 (the signal $V_L'$ below) the signal injected at 53 must be scaled up by a factor represented by the following formula:

$$V_L' = V_B\left(\frac{Z_0}{Z_0+R1}\right) = V_C\left(\frac{Z_0 - R2}{Z_0}\right)\left(\frac{Z_0}{Z_0+R1}\right) = V_C\left(\frac{Z_0 - R2}{Z_0+R1}\right) = V_C\left(\frac{Z_0 - R1}{Z_0+R1}\right)$$

where $V_c$ is the voltage injected at 53.

To demonstrate the technique an ASTAP model was created with real component values. The design point required satisfaction of three conditions:

1. The overall impedance of each bridge must equal the characteristic impedance of the respective line segment.
2. R1 and R2 must be equal.
3. The ratio $R2/Z_0$ must equal the ratio R3/R4.

In this demonstration, R1 and R2 were assigned values of 10 ohms each, R3 was assigned a value of 45 ohms, and R4 was chosen to be 450 ohms. The transmission line model was chosen to be 10 feet long, and broken into two sections, X1 and X2. The characteristic impedance of the line was set at 100 ohms, and the velocity factor (speed of signal propagation) was set at 6,173 inches/nanosecond (in/ns). FIG. 3E shows the complete circuit, and the ASTAP code list used was:

ASTAP Code List:

```
X1=RLINE CARD1 (IN-GND-5)
X2=RLINE CARD1 (6-GND-OUT)
EIN, RA-IN=((1.0)*(SINSQ(1,2,3,4,999,0,2)))
RIN, RA-GND=0.1
R1, 5-54=0.010
R2, 51-50=0.010
R3, 51-52=0.045
R4, 52-GND=0.45
R5, 50-gnd=0.100
JIN, 5-52=0
JREF, GND-50=((VJJIN)*134.10252)
R11, 6-61=0.010
R22, 61-60=0.010
R33, 61-62=0.045
```

R44, 62-GND=0.45

R55, 60-gnd=0.100

JJIN, 6-62=0

JJREF, GND-60=((VJIN)*134.10252)

ROUT, OUT-GND=0.800

RLINE CARD1 (IN-REF-OUT)

ELEMENTS

Z0=0.1

T0=0.162

PL=12

In this list: X1 and X2 represent the left and right segments of the transmission line; EIN, RA-IN represents the voltage stimulus; RIN, RA-GND defines the input series resistor value (100 ohms); R1 to R5 define values in ohms of resistors R1 to R5; JJIN represents a current source of 0 (to observe voltage); JJREF, GND-60 represents a current source (upscaler); ROUT, OUT-GND defines a terminating resistor value (800 ohms); RLINE CARD1 (IN-REF-OUT) indicates a transmission line function; Z0 defines the characteristic impedance of the line; T0 defines the line propagation delay (in ns per inch); and PL indicates a propagation length factor of 12 inches.

Figure 4:
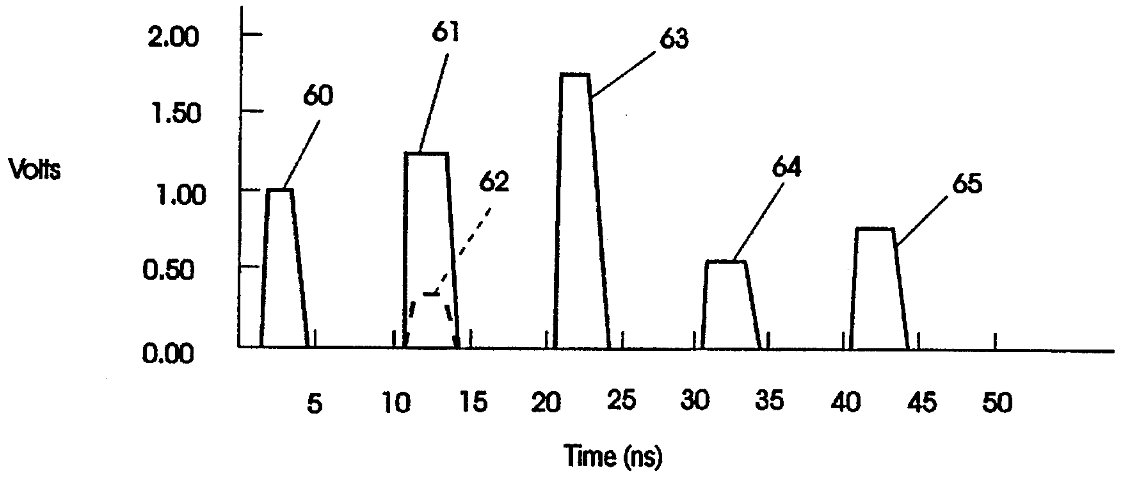
FIG. 4 shows outputs sampled at various instants of time, at a bridged point in the line model of FIG. 3E, assuming a 1 volt input pulse and a terminating resistor of 80 ohms.

A 1-volt input pulse was chosen to demonstrate the model (a 2-volt step divides across the input impedance and Z0). An input impedance of 100 ohms and terminating impedance of 800 ohms were chosen to produce a 0.78 volt positive reflection to be dissipated in the input impedance. FIG. 4 shows the ASTAP output graphically (using the RCAID feature of ASTAP).

The input pulse is seen at 60. At 61, between 10 and 15 ns, the incident wave is seen crossing the bridges. The component 62 seen by the incident wave detector and the simultaneous upscaled signal 61 on the right hand bridge are apparent. At 63, the incident wave appears at the output resistor between times 21 and 24 ns. At 64, the reflection is felt by the right-hand generator between times 30 and 33 ns, but is not sensed by the incident wave detector. Finally, at 65, the reflection appears back at the input between times 40 and 43 ns, showing that the bridges have worked properly in both directions.

3.2. Method as Applied to Network of FIG. 1

Figure 5:
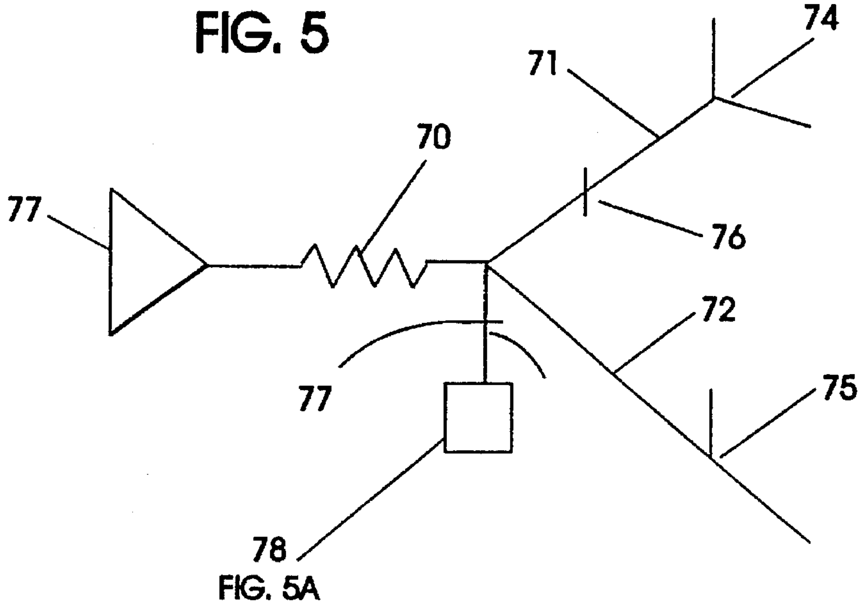
FIG. 5 shows a simulation model of the network of FIG. 1 with polarized bridges inserted into branches of unequal length, in accordance with an analysis procedure representing one aspect of the invention; where the polarized bridges form devices that represent another aspect of the invention; and where a compensating circuit is shown attached to a shortest branch of the network in accordance with yet another aspect of the invention.

FIGS. 5–7 are used to explain the subject bridge simulation method, as applied to the network of FIG. 1 (one line splitting into two branches of equal length and a third branch shorter than the other two).

The simulation model is seen in FIG. 5. The driver shown at 70, has its output connected to the branching node of lines 71, 72 and 73. The branch lines are chosen to have characteristic impedances of 60 ohms each, and the damping resistance of the driver is set to ⅓ the characteristic line impedance, 20 ohms. Lines 71 and 72, which connect to the cache RAM trees, are assigned lengths of 10 inches each from the branching node at the driver to their sub-branches at 74 and 75. Recall that in the physical implementation, these sub-branches each connect to a cache RAM and the lines extending from each node each represent lines connecting to four additional cache RAM's. The lines extending from the sub-branches are each 2 inches long.

Line 73, the shortest branch, is only six inches long. Recall that this line, in the physical implementation, connects to the cache controller.

For making the signal measurements, long and short branches 71 and 73 are split at the driver branch node, and simulated bridge constructs (refer to FIG. 3E) 76 and 77 are connected to respective splits. Initially, line 73 is uncompensated, but after the first measurements are completed, a simulated compensating circuit 78 is attached to the end of that line.

The objective in this procedure is to compare the reflections presented by lines 71 and 73 at the driver branch node, and to configure the compensating circuit 78 to make these reflections match as near as possible, in both phase and amplitude. Since lines 71 and 72, are identical in the model (and similar in length and form in the manufactured equivalent circuit), when this objective is realized the reflections in all branches will be identical at the driver branch node, and (as stated earlier) they will "blend harmoniously" at the driver so that re-reflections from the driver to the three branches are effectively minimized. As shown below (in reference to FIG. 7B), the corollary effect is that the composite signals appearing at loads in each branch have effectively minimal distortions (ringing, overshoot, undershoot, etc.).

Figure 5A:
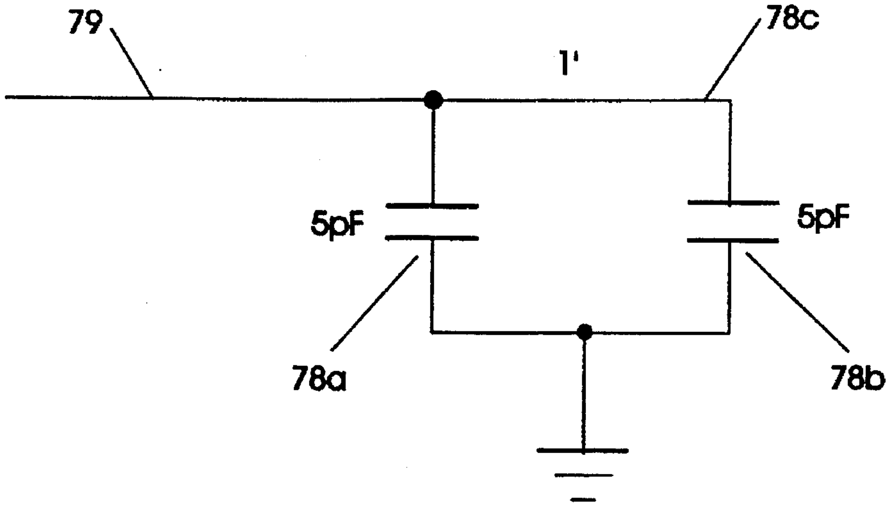
FIG. 5A shows a detail of the preferred form of a compensating circuit element that is shown as a block in FIG. 5.

The form of the compensating circuit construct used in the analysis model is shown in FIG. 5A. It attaches to the end of line 73, represented at 79, and includes capacitors 78*a* and 78*b*, each having a capacitance of 5 picofarads (pF), and a one inch line segment 78*c* connecting them. The capacitors terminate at ground, and represent a lossless impedance designed to produce reflections with predetermined characteristics. The 1 inch line segment represents a transmission line stub which adds a desired phase delay to the reflections. It should be understood that the compensator shown is idealized, and in the physical embodiment the capacitor 78*a* may be eliminated and the capacitance of capacitor 78*b* increased to provide approximately equivalent effects.

In a physical embodiment corresponding to this model, the 14 address lines requiring compensation were each compensated by a one inch stub in series with a single point capacitor having a capacitance of either 15 pF or 27 pF (selected to compensate for variations in placement of printed circuit traces constituting the 14 lines). These pF values represent choices of components conveniently available and suited to the purpose. For other board or network configurations pF values in the range 5 to 80 pF could be suitable. It is understood that the compensating stub extends beyond the connection between the shortest branch and the cache controller (i.e. it does change the signal propagation distance between the driver and the cache controller).

Figure 5B:
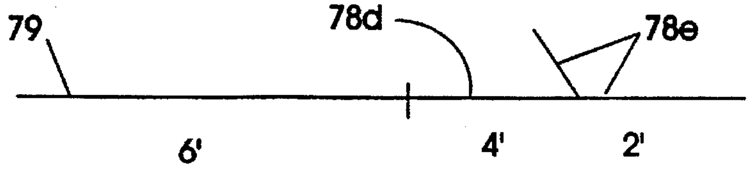
FIG. 5B shows a detail of an alternate form of compensating element that could be used to improve operation of the network, but could be more difficult to implement than the arrangement of FIG. 5A, in a printed circuit package having limited space for additional circuitry.

An alternative model for a compensating circuit, shown in FIG. 5B, consists simply of a 4 inch line segment 78*d* connecting to two 2 inch segments 78*e*. This configuration effectively mirrors the configurations of lines 71 and 72 and their sub-branches, by extending the length of line 73 (to the point at which the compensating reflections are generated, without affecting the placement of the cache controller load) to 10 inches, and adding the 2 inch sub-branches. In many contemporary printed circuit package topologies, where space is always at a premium, this alternative configuration might be impractical to implement. However, it should be understood that if current technological trends continue, signal speeds will increase and line lengths between drivers and loads should decrease. Consequently, the alternative compensation of FIG. 5B eventually could become more practical to use and even preferrable inasmuch as it should provide more precise matching and cancellation of reflections.

Those skilled in the art will recognize that many other forms of compensating circuits could be used to provide matching reflections; subject to considerations of manufacturing cost and practicality.

Figure 6A:
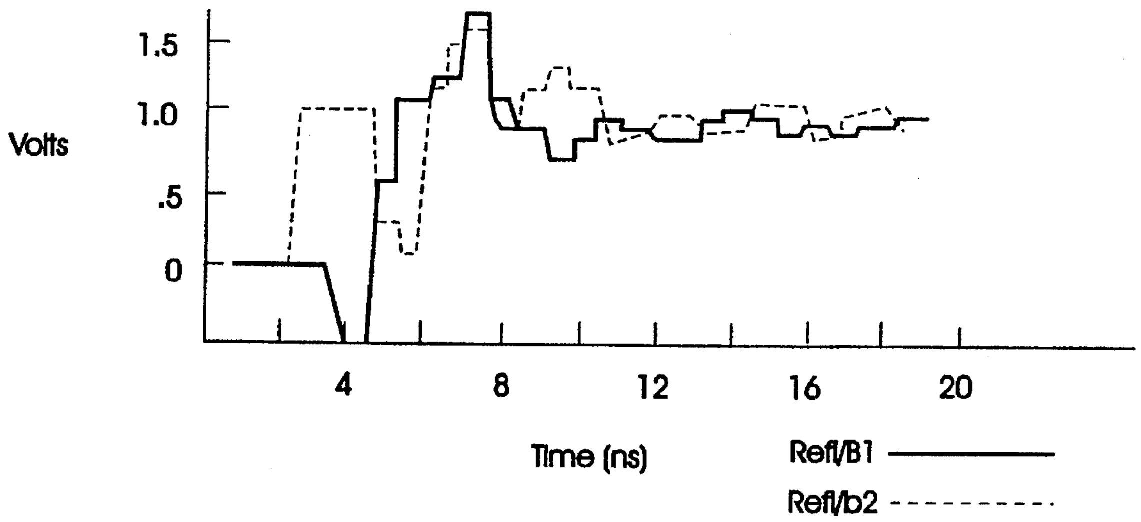
FIGS. 6A and 6B contrast appearances of reflected signals derived from the subject analysis process, in bridged branches of the modelled network, before and after introduction of compensation into a shorter one of the bridged branches. In these figures.
Figure 6B:
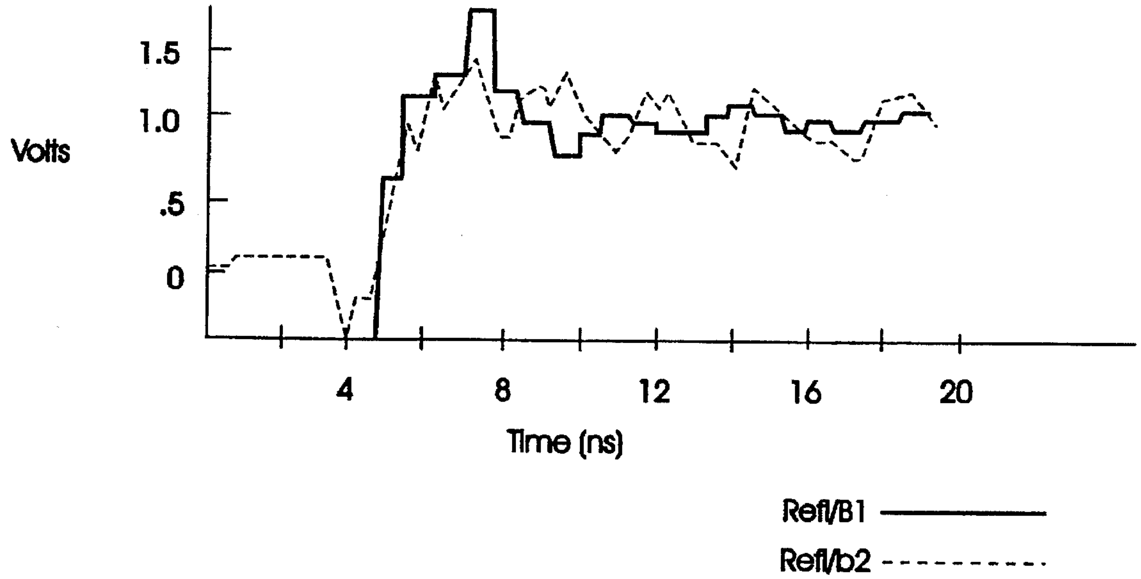

Continuing the discussion of the analysis process, the model circuit was pulsed (at the driver node) with a +2 volt step having a rise time of 100 picoseconds, and the resulting reflections in lines 71 and 73 were observed at respective polarizing bridges 76 and 77. The reflections before addition of the model compensating circuit are seen in FIG. 6A, and those after compensation are shown in FIG. 6B. As expected, the reflections in bridge 76 (B1 or bridge 1), connected to the uncompensated branch, are identical in both figures, and the reflections in the other bridge B2 are different in both figures. Note that the reflections in B1 show a negative dip around 4 nanoseconds, and the uncompensated reflections in B2 are constantly positive in polarity. Note further that with compensation, the reflections in B2 include a negative dip like the one in B1, and both reflections have consistently similar phase and amplitude characteristics.

Figure 7A:
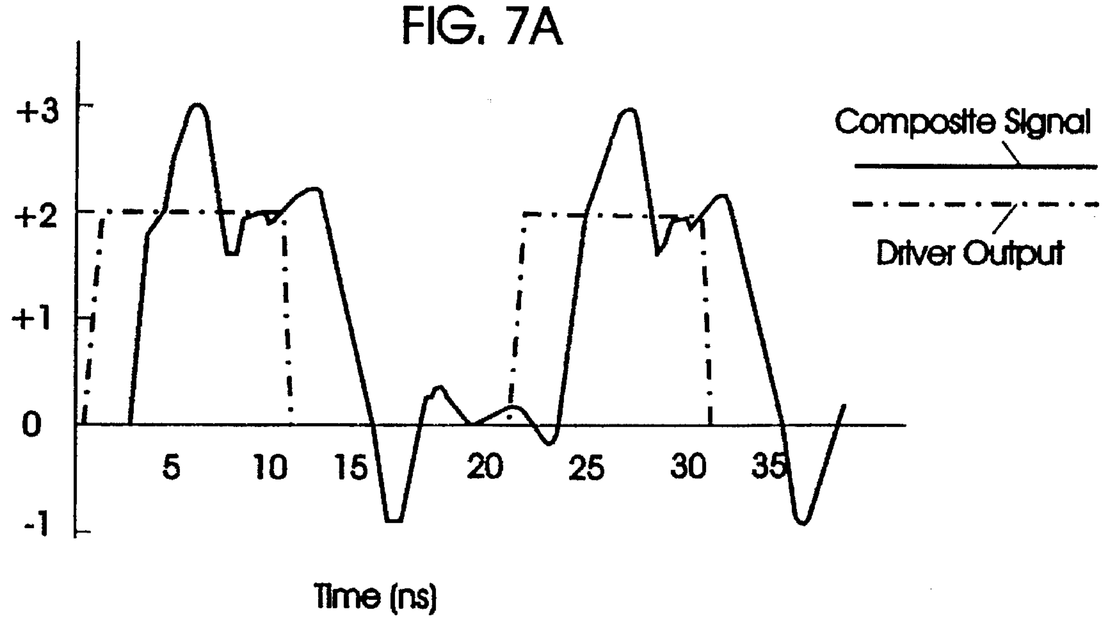
FIGS. 7A and 7B contrast appearances of composite signals, at a point in the routing network of FIG. 5 that is furthest from the signal driver shown in that Figure.
Figure 7B:
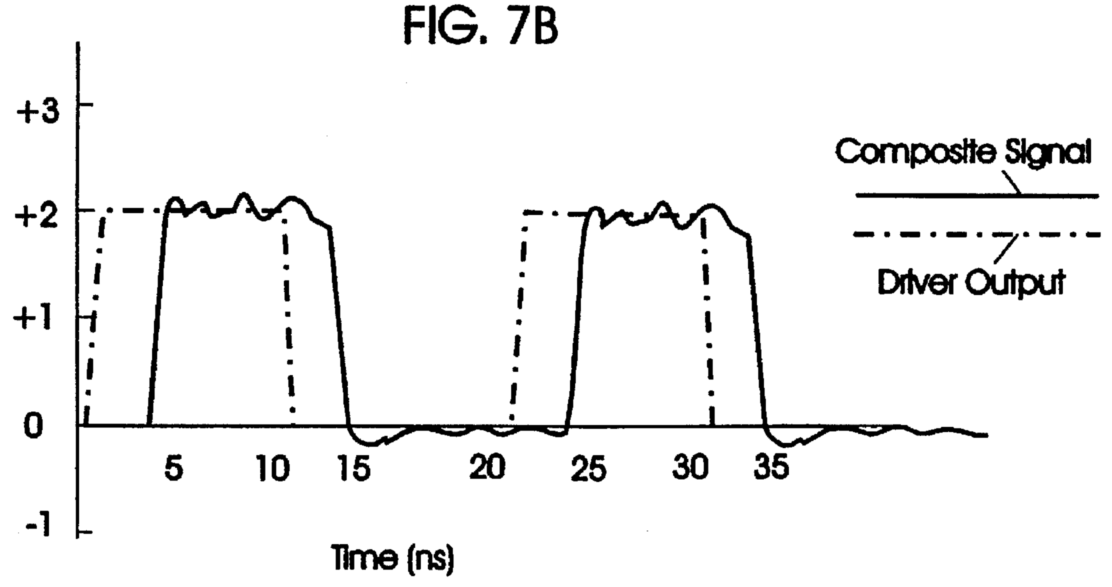

The resulting composite signals at the end of one of the sub-branches originating at 74 are shown in FIGS. 7A and 7B (7A without compensation and 7B with compensation). The composite signals at other positions in the network may be different. In FIG. 7A, note the rather severe overshoot around 5 ns and undershoot around 15 ns (which over time could damage protective diodes in a real physical embodiment, and eventually destroy detection circuitry rendering load devices (e.g. the caches and/or cache controller) inoperative. Contrast that to the more stable waveform of FIG. 7B. Note also that this analysis focuses only on reducing effects of reflections, and ignores other potential causes of noise in real embodiments (e.g. crosstalk between printed circuit traces, driver imperfections, etc.). Accordingly, it should be understood that in "worst case" circumstances, the composite signals seen in both FIGS. 7A and 7B could have more distortion than is seen here, but then the effect of the increased distortion in the uncompensated circuit would obviously be more severe than that in the compensated circuit.

Although the comparisons of FIGS. 7A and 7B are taken at one end point of a longest path in the network, and although compared functions might be different if viewed at other positions (e.g. at the point of attachment of compensation) a general observation has been that the form of the composite with compensation is invariably improved over the composite without compensation.

Another point to note is that a circuit to be modelled could have fewer or more branches at a driver node (e.g. 2 or 4 branches) for this type of analysis, and even have sufficient asymmetry in supposedly symmetrical branches, to consider use of more than 2 bridges and provision of compensation in more than one branch. Consideration of using more than one compensating circuit per network would of course be offset by considerations of manufacturing cost for the additional circuitry.

I claim:

1. A bridge device comprising:

first and second discretely separate bridge circuits each attachable to a corresponding end of corresponding first and second segments of a split transmission line; each of said bridge circuits being in circuit communication with the other of said bridge circuits and having:

a signal detection circuit detecting signals propagating to the end of said corresponding line segment from the opposite end of said corresponding line segment;

a signal generating circuit generating an amplified copy of a signal detected by the signal detecting circuit in the other of said bridge circuits; and a connecting circuit applying signals generated by said signal generating circuit to the end of said corresponding line segment to which the respective bridge circuit is attached.

2. A bridge device in accordance with claim 1 wherein:

said signal generating circuit in each of said bridge circuits generates signals in a form such that said signals, after propagating through the respective bridge circuit to the respective line segment, appear at the respective line segment as exact replicas of signals appearing at the end of the other line segment.

3. A bridge device in accordance with claim 2 wherein said transmission line has a predetermined characteristic impedance and:

said signal generating circuit in each of said bridge circuits is configured to present an impedance matching said characteristic impedance relative to the line segment to which the respective bridge circuit is attached.

* * * * *